United States Patent [19]

Brennan

[11] Patent Number: 4,533,175

[45] Date of Patent: Aug. 6, 1985

[54] CONVERTIBLE SEAT

[75] Inventor: Edward J. Brennan, Litchfield, Conn.

[73] Assignee: PTC Aerospace Inc., Bantam, Conn.

[21] Appl. No.: 565,242

[22] Filed: Dec. 23, 1983

[51] Int. Cl.³ .............................................. A47C 15/00
[52] U.S. Cl. ................................... 297/232; 297/113; 297/115; 297/124; 297/146; 297/417
[58] Field of Search ............... 297/232, 124, 127, 146, 297/115, 116, 417, 113

[56] References Cited

U.S. PATENT DOCUMENTS

| | | | |
|---|---|---|---|
| 1,399,744 | 12/1921 | Brophy | 297/417 |
| 1,424,302 | 8/1922 | Helms | 297/417 |
| 3,877,747 | 4/1975 | Brennan et al. | 297/124 |
| 3,893,729 | 7/1975 | Sherman et al. | 297/232 |
| 3,910,632 | 10/1975 | Marechal | 297/232 |

OTHER PUBLICATIONS

Brochure entitled "Series 90 Convertible" by Flight Equipment Engineering Ltd., Buckinghamshire, England.
Brochure entitled "The Convertible" by Flight Equipment Engineering Ltd. Buckinghamshire, England.
Trans–Australia Airlines Drawings B27D50–B14, B16–20 dated 3,9,79.

Primary Examiner—Francis K. Zugel
Attorney, Agent, or Firm—Thomas K. McBride; William H. Page, II; Barry L. Clark

[57] ABSTRACT

Convertible aircraft passenger seat can be quickly changed from a three-seating position configuration to a more spacious two-seating position configuration without the use of tools. Such a seat permits the seating capacity of an aircraft to be altered to match the expected passenger load in different classes, such as tourist and business class. In the three-position configuration, a pair of relatively narrow width armrests, which may contain recline lock control cables or audio cables, project vertically out of the lower seat cushion on either side of the center seating position but are pivotally mounted so that they will overlie the center position in a generally horizontal fashion in the two-position configuration, thus adding several inches of width to the adjacent end seating positions. Each of a pair of elongated back cushion side extensions has fastening means on one side thereof by which it may be alternatively attached to one side of a relatively narrow center position back cushion in the three-position configuration or to an inboard side of one of the end position back cushions in the two-position configuration. In the latter configuration, the relatively narrow center back cushion is folded forward where it conceals the laterally folded narrow armrests and forms a wide armrest and/or cocktail table between the two wide seats.

4 Claims, 7 Drawing Figures

U.S. Patent  Aug. 6, 1985  4,533,175
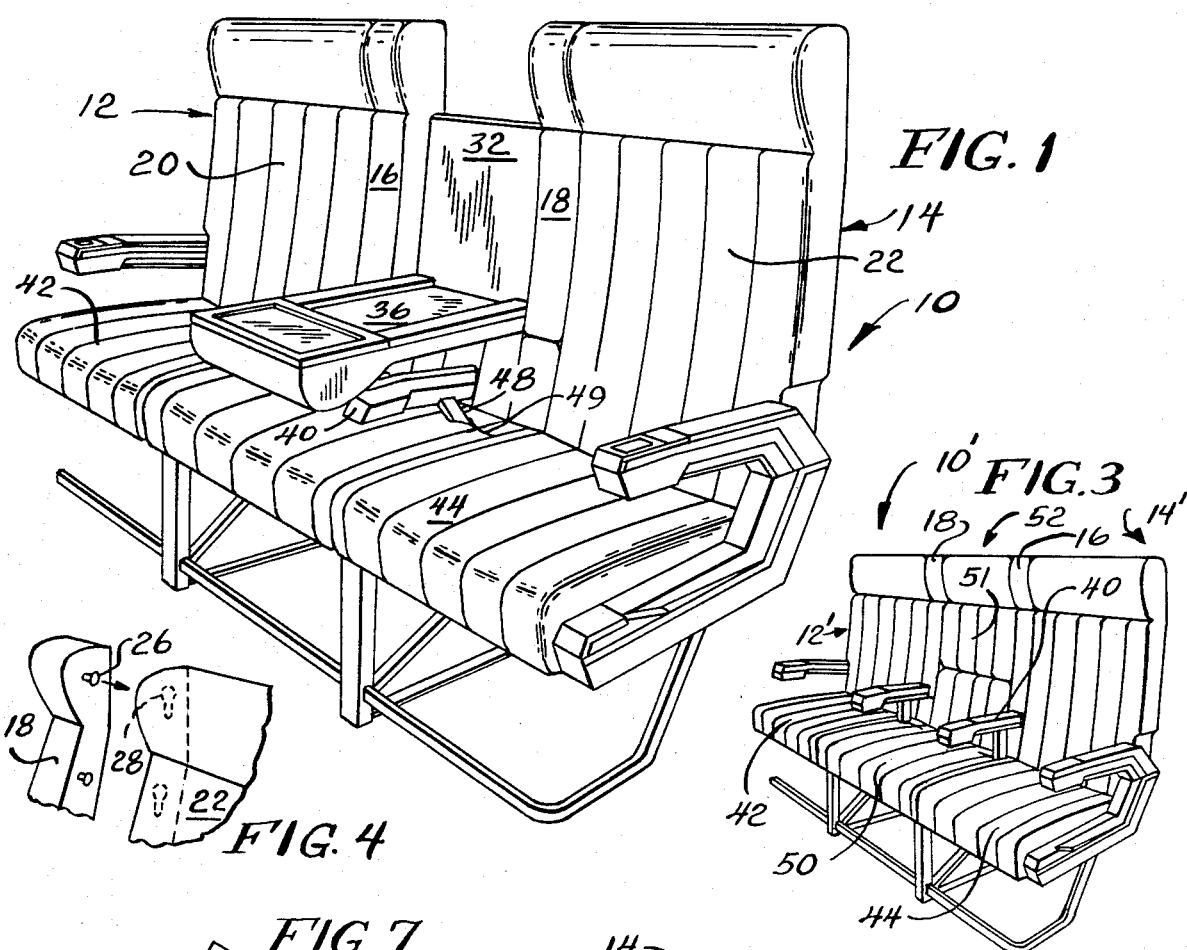
FIG. 1
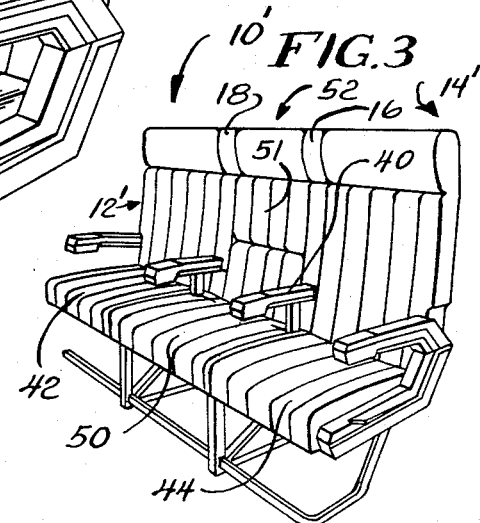
FIG. 3
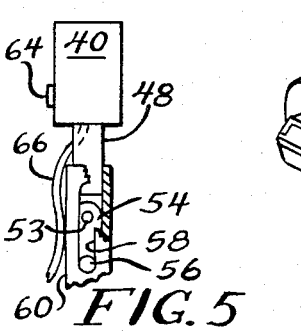
FIG. 4
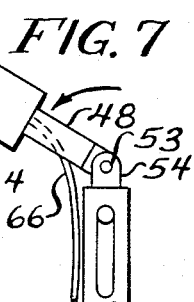
FIG. 7
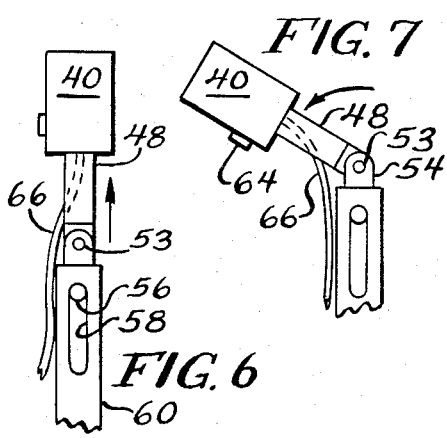
FIG. 6
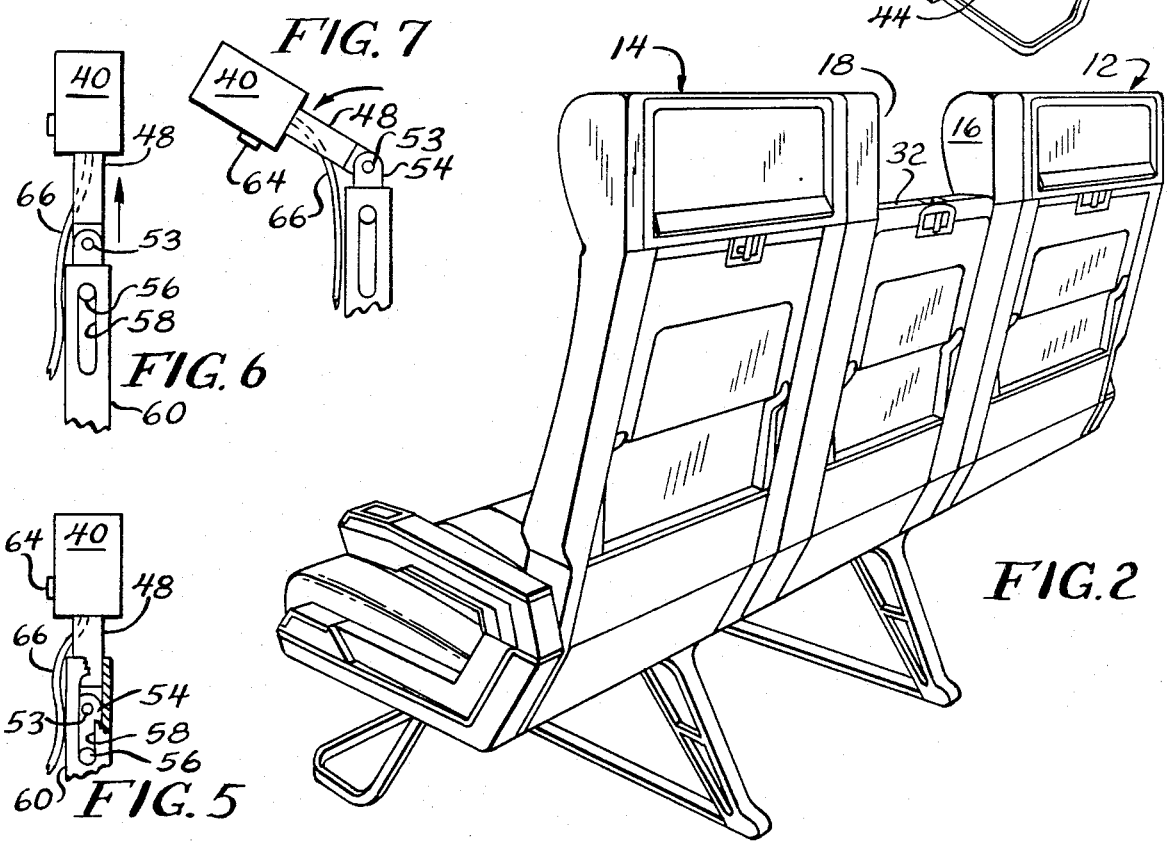
FIG. 5
FIG. 2

CONVERTIBLE SEAT

BACKGROUND OF THE INVENTION

The invention relates to aircraft seats and to the problems encountered by an airline that offers different classes of seating on a single aircraft. As a rule, the total width of a 3-position tourist seat is generally the same as a 2-position first class or business class seat. When there are plenty of extra tourist seats available on a plane, a portion of the center position back cushion can often be folded down, as disclosed in Brennan U.S. Pat. No. 3,877,747 or Marechal U.S. Pat. No. 3,910,632, to a generally horizontal position where it serves as a cocktail table and/or a wide armrest between the end seating positions, permitting the normal center armrests to be folded vertically so as to increase the seat width of the end positions. The extra width increases comfort for the occupant's hip region but does little for the shoulder region since the folded-up armrest is quite hard. Furthermore, the aforementioned seat could probably not be marketed to passengers as a higher class seat since it obviously looks like a tourist seat.

When the demand for seats on a given flight is greater for one class than the seats available, the airline is faced with a number of difficult choices. If they turn the passenger away, they lose revenue, assuming there are unsold seats in another class. If they upgrade a tourist passenger to a higher class, they give more than they bargained for and also run the risk of offending the other passengers in the higher class who paid more for their seats. If there are excess tourist seats and a shortage of higher class seats, there is a risk of losing the potential passenger to another airline, or losing the additional revenue an additional higher class seat would bring. Furthermore, a passenger willing to pay for the comfort of a higher class seat is not pleased when forced to accept a lower class seat.

In an effort to resolve the aforementioned problems of multi-class seating, some airlines have experimented with single class seating. However, the public is usually not very satisfied with such an arrangement, especially when competitors offer multiple classes. A solution to the problem would seem to be a seat which could convert from three positions to two or vice versa.

One company, Flight Equipment Engineering Ltd., of Chesham, England has published literature describing a pair of convertible seats which they refer to as "The Convertible" and the "Series 90 Convertible". In the former design, the center seat back is split vertically down the center so that in a double configuration the center seat back portions can be unlocked and separated from each other and then reattached to the end seat backs. The two unneeded center seat armrests are then pivoted up into a storage recess in the backs of the end seats while a pivoted combination back cushion and wide armrest/cocktail table which ordinarily overlies a portion of the split center seat back is pivoted down to a horizontal use position. Because of the split center seat back, two small tray tables are provided for the center seat back, one for each half. Although the design does indeed convert between 2 and 3 seating positions, it would seem to require a number of additional parts and a not insignificant increase in seat weight because of the double number of supports required to support two center seat back portions and two center seat back tray tables. Additionally, the inboard tray table legs would seem to provide some possibility of interference with the knees of a center position passenger. The need to store the tourist class armrest in the back cushion would possibly seem to present an uneven cushioning effect across the width of the back cushion and would also seem to detract somewhat from the esthetic appearance presented by a more uniform back. The large inboard notches which are present in the seat back cushions in the double seat configuration when the center cushion is moved down to form the armrest might also be considered to be less esthetically pleasing than a seat back having a uniform width and thickness. The "Series 90 Convertible" also has a vertically split center seat back and two center arms. However, the arms do not fold back into the seat backs nor does a portion of the center seat back fold down to form an armrest in the double configuration. Rather, the armrests are lifted completely out of a pair of relatively widely spaced receptacles and are repositioned in a pair of relatively closely positioned receptacles. In the latter position they are covered with a snap-on armcap which forms a wide armrest and cocktail table. Some disadvantages of the latter arrangement are that the separable center armrests could be lost or misplaced while the snap-on armcap is also a loose part which could be lost or broken and which is stored under a seat in the tourist configuration, thus decreasing storage space under one of the seats. Furthermore, loose armrests cannot contain the electrical cables required by inflight entertainment units.

Yet another convertible seat, which has removable center arms and a snap-on armrest cover, is disclosed in materials published by Trans-Australia Airlines. In this arrangement, the center seat back is in three sections which are pivoted near their bottom ends. The center section is the widest and has a single narrow tray table mounted on its rear surface which can be widened after being lowered to its use position by a pair of hinged, foldover side extensions. The conversion operation appears to be fairly time-consuming since the center seat headrest cover must be removed, two zippered cover portions must be opened and closed and several locking levers must be actuated to hold the seat back portions to each other. Finally, the center arms must be lifted out and relocated and the armcap must be moved from its storage position.

SUMMARY OF THE INVENTION

It is among the objects of the present invention to provide a light weight aircraft seating unit which will permit the relative mix of three-position tourist seats and two-position business or first class seats on a particular flight to be changed very quickly and at the last minute before the passengers are loaded. It is another object to provide such a seating unit in which the changes can be made without the use of tools and in a manner not readily obvious to a passenger. A further object is to provide a convertible seating unit in which the two-position configuration has not only a wider and more luxurious appearance, but provides more comfort than the three-position configuration. Yet another object is to provide a convertible seat which does not require the armrests to be disassembled or the use of selectively stored components such as armcaps.

The foregoing and other objects and advantages are achieved by the convertible double or triple seat of the present invention. One principal feature is the use of a pair of backrest cushion extension portions which are selectively attached, without tools and without the need to remove the seat dress covers, to the side edges of the seatbacks. The back frame of the center seat position is less wide than the seat back frames of the end seats by an amount approximately equal to the combined width of the pair of backrest cushion extension portions. When a three-position tourist seating configuration is desired, the extensions are located on the sides of the center seat back cushion. Similarly, when two wider seats are preferred, the extensions are removed from the center seat back and attached to the inboard edges of the backrests of the end seats. The armrests for the center seat are attached to the seat frame so they will be vertically positioned during use. The mounting preferably includes structures such as a lost motion mechanism and a pivot so that the armrests may be lifted a short distance and then pivoted sideways so as to overlie the bottom cushion of the center seat position. Since the armrests often contain wires and/or cables for audio entertainment, it is preferable that they not be separable from the seat.

BRIEF DESCRIPTION OF THE DRAWINGS

FIGS. 1 and 2 are front and back perspective views of the improved convertible seating unit in its double seat configuration;

FIG. 3 is a front perspective view similar to FIG. 1 but showing the unit in its triple seat configuration;

FIG. 4 shows one technique for fastening the back cushion extension portions to the seat back frames; and FIGS. 5-7 are fragmentary front views illustrating the operation of the armrest mounting mechanism.

DETAILED DESCRIPTION

Referring to FIGS. 1 and 2, the convertible seating unit is shown in its first or business class double seat configuration indicated generally at 10. In this configuration, the end seats 12, 14 are substantially wider than the end seats 12', 14' shown in the triple seat tourist configuration unit 10' in FIG. 3. The additional width is provided by the selective attachment of cushion extension members 16, 18 to seat back members 20, 22, respectively. The extension members 16, 18 can be attached in any suitable manner such as with elongated interlocking channels (not shown) or with headed pins 26 which engage keyhole-shaped slots 28, such as shown in FIG. 4. The center seat back frame member 32 is less wide than the end seat back members 20, 22 by an amount about equal to the combined width of the two cushion extension members 16 and 18. Pivotally mounted to the frame member 32 is a wide armrest and cocktail table member 36 which can be folded down to the horizontal position shown in FIG. 1, leaving the frame member 32 positioned generally vertically where it provides a privacy screen. The armrests 40 are not used in the FIG. 1 configuration and are lifted and pivoted sideways to a storage position underlying the armrest/table member 36, thus increasing the effective width of the end seat cushions 42, 44. As shown, the vertical support member 48 which is affixed to the armrest is positioned generally horizontal and may pass through a slot 49 in the center seat cushion 50 if desired, to enhance its concealment.

FIG. 3 shows the tourist or triple seat configuration 10' which is achieved by lifting the armrests 40 of FIG. 1 to their vertical use position, lifting the armrest/table member 36 to its vertical position in contact with back frame 32, removing the back cushion extensions 16, 18 from the seat backs 20, 22 and attaching them to the center back frame 32 as shown at 16, 18. The addition of extensions 16, 18 to the narrow back cushion 51 which is on the forward side of member 36 causes the center seat 52 consisting of bottom cushion 50 and back cushion 51 to have about the same width as end seats 12', 14'.

The mounting mechanism for the armrests 40 is illustrated in FIGS. 5-7 wherein it can be seen that the armrest 40 has a first member 48 such as a tube projecting down to a pivot pin 53 which mounts the member for pivotable movement relative to a second tubular slider member 54. The slider member 54 carries at least one stud or pin 56 which has a limited amount of vertical travel in a slot 58 formed in a tubular socket member 60 which is fixedly mounted (not shown) to the seat frame. The travel is sufficient so that in the uppermost position shown in FIG. 5 the pivot pin 53 will be outside of the socket 60 so that the armrest 40 and its support member 48 can be pivoted generally horizontal as shown in FIG. 3 and FIG. 1. At the lowermost position of travel shown in FIG. 6, the pin 56 is at the bottom of slot 58 and the pivot pin 53 and a portion of the member 48 are restrained by the socket member 60.

The armrest 40 is depicted in FIGS. 5-7 as having a recline lock button 64 and a control cable 66 to actuate the lock (not shown). The cable 66 is substantially concealed from view by virtue of being mounted to pass down through the tubular member 48 and out of a hole (not shown) in its side and between the cushions 50, 44.

The operation of the seat assembly in converting from the FIG. 3 triple or tourist class configuration to the FIGS. 1 and 2 double configuration is as follows: Preferably, the person changing the configuration stands behind the center seat 50 and reaches over its back to lift the two armrests 40 to their FIG. 5 temporary position from their use position (FIG. 6) and then pivot them to their storage position (FIG. 7). The entire center seat back consisting of frame 32 and cushion 50 is then pushed forwardly to expose the side extension cushions 16, 18 which are then easily disassembled from the center seat back frame 32. The extension 16 which was on the left side of the center seat 50 is then assembled to the left side of the right seat 12. Similarly, extension 18 is assembled to the right side of the left seat 14. The entire center seat back is then pulled back to its upright position. At this point, the cushion portion 50 is pushed forward to release it from its spring-ball detent engagement with the seat back frame 32 and pivoted to a generally horizontal position where it will overlie the folded armrests 40 and form the wide armrest/cocktail table 36.

It will be appreciated that the aforementioned technique for converting a seating configuration can be accomplished extremely rapidly and without the use of tools. Thus, it would usually be possible to change the balance between tourist and upgraded classes of seats at the last minute before passengers were ready to board a flight. It can also be appreciated that appropriate styling techniques, such as the use of upholstered cushion dress covers incorporating a plurality of narrow vertically extending pleated panels, can produce an esthetic effect, as evident in FIGS. 1 and 3, in which the side extensions 16, 18 will appear to be integral with whichever seat back they are attached to.

I claim as my invention:

1. A convertible seat assembly which is quickly changeable between a first configuration having three relatively narrow seating positions with intermediate relatively narrow armrests, and a second configuration having two relatively wide seating positions with an intermediate relatively wide armrest, said assembly having three separately reclinable back frame members with the center seat back frame member being narrower than the end seat back frame members, the center seat back frame member having a back cushion portion which is pivotally mounted for movement between a generally vertical use position contacting said center back frame member in said first configuration for supporting an occupant's back, to a generally horizontal cocktail table and/or armrest position overlying the center seat bottom cushion in said second configuration, the center position back cushion portion having a width which is generally equal to the width of the center back frame member and less than the width of the end position back cushion portions, a pair of detachable back cushion extension members which are selectively attachable by complementary fastening means to each side of the center position back cushion portion in said first configuration, and to the inboard sides of the end cushion portions in said second configuration, said pair of narrow armrests being non-detachably mounted to the frame of said seat assembly for movement between a use position in a generally vertical plane where they separate the seating positions in said first configuration and a stowed position in a generally horizontal plane in which they underlie the center back cushion portion in its generally horizontal armrest position and overlie the center seat bottom cushion in said second configuration.

2. The seat assembly of claim 1 wherein said back cushion extension portions have fastening means extending from only one side thereof and are completely upholstered on the opposite side thereof.

3. The seat assembly of claim 1 wherein said non-detachable mounting for each of said pair of narrow armrests comprises a generally vertical tubular socket member attached to a frame portion of said seat assembly, a first tube member mounted on and projecting downwardly from the underside of said narrow armrest and a second tube member mounted in said tubular socket member, a pivot connection pivotally connecting said second tube member at its upper end to the lower end of said first tube member, said second tube member being vertically slidable within said socket member in a predetermined path of travel, said path of travel being limited by cooperating stop means on said second tube member and said socket member so that in the upper position of said second tube member said pivot connection is above said socket member so as to permit movement of said armrest and first tube member to a generally horizontal stored position, said cooperating stop means also determining the lowest position of said second tube member wherein said armrest is in its use position and said pivot connection and a portion of said first tube member are positioned within said socket member and restrained thereby.

4. The seat assembly of claim 3 wherein said cooperating stop means includes at least one stud projecting from said second tube member and an elongated slot in said socket member in which said stud can move.

* * * * *